United States Patent Office 2,906,372
Patented Sept. 29, 1959

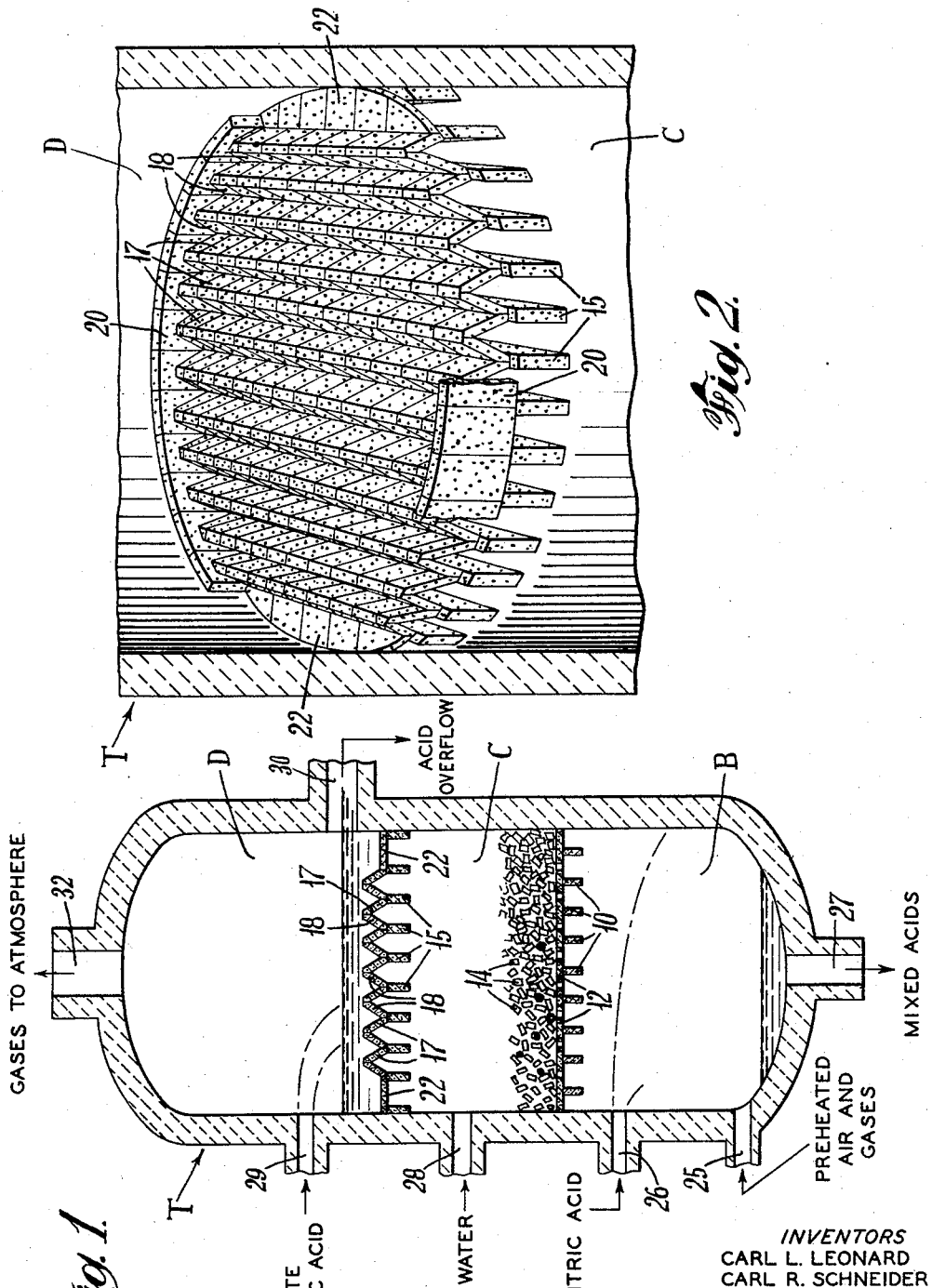

2,906,372

SULFURIC ACID MIST REMOVAL

Carl L. Leonard, La Marque, Tex., Carl R. Schneider, Palos Verdes, Calif., and James K. Sheppard, La Marque, Tex., assignors to Union Carbide Corporation, a corporation of New York Application January 31, 1957, Serial No. 637,415

2 Claims. (Cl. 183—121)

In numerous different industrial processes involving sulfuric acid, including the manufacture of synthetic alcohols and treatment of petroleum, the acid enters the process in concentrated form and leaves diluted. The diluted acid is commonly concentrated for reuse in "air-blown" or "drum type" concentrators, in which a hot mixture of furnace gases and air is forced with intimate contact through drums containing the acid, such that water in the acid is evaporated into the hot gas stream which leaves the drums and is vented into the atmosphere. The waste gases almost invariably contain sulfuric acid and/or sulfur trioxide in the form of a stable and finely divided mist, which is a nuisance to surrounding industries and residences as well as an economic loss.

The main object of the present invention is therefore to provide efficient recovery of mist from the exhaust gases from the concentration of sulfuric acid.

According to the present invention sulfuric acid mist is removed from a gaseous mixture containing the same by passing said mist containing gaseous mixture upward through porous plates covered with a free level of sulfuric acid of 60 to 72% concentration.

The details of invention will be better understood from the following description and the accompanying drawing, wherein:

Figure 1 is a sulfuric acid mist treatment tower.

Figure 2 is a detailed showing of a porous plate used in the invention.

As shown in the drawing, a tower T is preferably a steel shell lined with lead and acid proof brick. The interior of the tower T is divided into a lower oxidizing section B, a central packed entrainment section C, and an upper absorbing section D.

In the lower portion of the tower T between the sections B and C are mounted carbon beams 10 on which rest a carbon grid 12 for supporting a layer of Raschig rings 14. The rings form the packing for the entrainment section C.

In the upper portion of the tower T between the sections C and D are mounted carbon beams 15 on which rest the abutting beveled bottoms of rows of upwardly diverging porous plates 17 and 18. The beveled tops of the plates 17, supported by one carbon beam, engage the beveled tops of the plates 18, supported by the next carbon beam, making an included angle of about 60° to form a ridge roof thereover and therebetween. The V-shaped channels formed by the upwardly diverging plates between the ridge roofs are closed at each end by flat vertical plates 20. The spaces between the last carbon beams 15 and the adjacent sides of the tower are closed by horizontal segmental plates 22 conforming to the curvature of the tower.

The lower or oxidizing section B is provided with an inlet 25 for preheated air and gases, an inlet 26 for oxidizing agent, and an outlet 27 for mixed acids. The entrainment section C has an inlet 28 for water. The upper or absorbing section D has an inlet 29 for dilute sulfuric acid, an acid overflow outlet 30, and a vent or discharge outlet 32 to the atmosphere.

Porous plates tend to plug if entrained acid containing carbonaceous or other solid material is present in the mist-laden vapor passing through the plates. The three foot packed section C installed about two feet below the plates is necessary to remove the entrainment.

The plates 17, 18 and 22 must have small enough pores to give efficient mist removal yet large enough to maintain a low pressure drop. The plates must have sufficient structural strength and be resistant to the destructive nature of hot sulfuric acid. A rigid porous mineral plate composed essentially of silica is very satisfactory. A good plate is Filtros, Grade A, an inch and a half thick and one foot square, having a permeability of 80. The permeability is the amount of air in cubic feet at 70° F. and 25% relative humidity which will pass through an area of one square foot of dry porous plate in one minute when tested under an equivalent pressure differential of two inches of water.

The plates are cemented together with lead or Pennchlor and held in place with lead weights. The triangular construction gives about 90% greater effective plate area than flat plates, decreasing the pressure drop through the plates.

In operation, the exhaust gases from the concentration of sulfuric acid are passed through the inlet 25 into section B. Nitric acid or other oxidizing agent is occasionally added through the inlet 26 into admixture with the exhaust gases to oxidize carbonaceous material contained in the entrained acid which tends gradually to plug the pores of the plates 17, 18 and 22.

From the section B the vapors pass upward through the carbon grid 12 and packed layer of Raschig rings 14 thereon to remove the entrainment. From the section C the vapors free of carbonaceous material pass upward through the porous plates 17, 18 and 22.

Sulfuric acid of 60% to 72% concentration is fed through the inlet 29 into the absorbing section D, and excess acid is removed through the overflow outlet 30 to maintain a constant free level above the plates equivalent to about eight inches liquid level. The excess acid from the outlet 30 may pass to a tank and be returned to the inlet 29. Water is fed in the form of a spray through the inlet 28, preferably a mineral-free water and at a temperature of about 90° C., to maintain the liquid above the plates at temperature of 110° C. to 130° C. This concentration and temperature minimize corrosion of the lead without unnecessary further cooling of the exhaust gases.

The gases which pass upward from section C through the porous plates 17, 18 and 22 ascend through the level of concentrated sulfuric acid thereon whereby the mist in the gases is agglomerated and absorbed by the sulfuric acid. The gases from which the mist is removed ascend and are discharged to the atmosphere through the vent 32.

With no liquid above the plates a mist removal efficiency of 30 to 60% is obtained, but with a sulfuric acid level of two to ten inches an efficiency of 85 to 95% is realized.

What is claimed is:

1. Method of removing sulfuric acid mist from a gaseous mixture containing the same comprising passing said mist-containing gaseous mixture through porous mineral silica plates covered with a free level of sulfuric acid of 60 to 72% concentration maintained at a temperature between 110° C. to 130° C.

2. Method of removing sulfuric acid mist from a gaseous mixture containing the same which comprises passing said mist-containing gaseous mixture into an oxidizing zone, introducing nitric acid to said oxidizing zone and oxdizing carbonaceous material entrained in said mixture, passing said gaseous mixture through an entrainment zone for removal of carbonaceous material entrained in the gaseous mixture, and thereafter passing said gaseous mixture upward through porous silica plates covered with a free level of sulfuric acid of 60 to 72% concentration maintained at a temperature between 110° C. to 130° C.

References Cited in the file of this patent

UNITED STATES PATENTS

| | | |
|---|---|---|
| 2,008,363 | Maris | July 16, 1935 |
| 2,040,941 | Jones et al. | May 19, 1936 |
| 2,539,519 | Melendy | Jan. 30, 1951 |
| 2,730,194 | Wohlers et al. | Jan. 10, 1956 |
| 2,762,690 | Dockendorff | Sept. 11, 1956 |